US011933226B2

(12) United States Patent
White, III (10) Patent No.: US 11,933,226 B2
(45) Date of Patent: Mar. 19, 2024

(54) HEAT SHIELD AND METHOD OF INSTALLING THE SAME

(71) Applicant: Raytheon Technologies Corporation, Farmington, CT (US)

(72) Inventor: Robert A. White, III, Meriden, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/743,735

(22) Filed: May 13, 2022

(65) Prior Publication Data

US 2023/0366352 A1    Nov. 16, 2023

(51) Int. Cl.
  *F02C 7/24*       (2006.01)
  *F01D 25/14*      (2006.01)

(52) U.S. Cl.
  CPC .............. *F02C 7/24* (2013.01); *F01D 25/145* (2013.01); *F05D 2220/32* (2013.01); *F05D 2230/60* (2013.01); *F05D 2240/15* (2013.01); *F05D 2260/231* (2013.01); *F05D 2260/33* (2013.01)

(58) Field of Classification Search
  CPC .......... F01D 25/14; F01D 25/145; F02C 7/24; F05D 2240/15; F05D 2260/231; B32B 2307/304; B32B 3/06
  See application file for complete search history.

(56) References Cited

U.S. PATENT DOCUMENTS

| 2,719,099 | A | * | 9/1955 | Holbrook | F02C 7/24 220/592.24 |
| 4,008,747 | A | * | 2/1977 | Devers | B22D 19/00 164/112 |
| 4,087,199 | A | * | 5/1978 | Hemsworth | F01D 11/08 415/197 |
| 4,795,047 | A | * | 1/1989 | Dunwoodie | B65D 88/14 220/688 |
| 4,925,365 | A | * | 5/1990 | Crozet | F01D 9/04 415/173.6 |
| 5,174,714 | A | * | 12/1992 | Plemmons | F01D 25/145 415/177 |
| 5,176,495 | A | * | 1/1993 | Honkomp | F02C 7/24 415/173.1 |

(Continued)

FOREIGN PATENT DOCUMENTS

| CN | 113062781 A | * | 7/2021 | ............. | F01D 25/14 |
| DE | 3411924 A1 | * | 10/1985 | ........... | F01D 25/145 |

(Continued)

OTHER PUBLICATIONS

European Search Report for European Patent Application No. 23170471.9 dated Sep. 27, 2023.

*Primary Examiner* — Topaz L. Elliott
(74) *Attorney, Agent, or Firm* — Carlson, Gaskey & Olds, P.C.

(57) ABSTRACT

A heat shield includes a first wall defined between a first end and a second end; a second wall defined between the first end and the second end, the second wall connected to the first wall at the first and second ends; a space defined between the first wall and the second wall; and thermal insulation disposed in the space. A gas turbine engine and a method of installing a heat shield in a gas turbine engine are also disclosed.

15 Claims, 7 Drawing Sheets

(56) References Cited

U.S. PATENT DOCUMENTS

| | | | | |
|---|---|---|---|---|
| 5,238,365 | A * | 8/1993 | Petsche | F01D 25/26 |
| | | | | 415/177 |
| 5,662,457 | A * | 9/1997 | Bechtel | F01D 25/145 |
| | | | | 415/176 |
| 5,916,093 | A * | 6/1999 | Fecko | B61D 17/005 |
| | | | | 52/630 |
| 7,311,216 | B2 * | 12/2007 | Donnelly | B29C 67/0044 |
| | | | | 220/1.5 |
| 9,771,827 | B2 | 9/2017 | Stanka et al. | |
| 9,841,033 | B2 * | 12/2017 | Henke | F04D 29/4206 |
| 10,329,950 | B2 | 6/2019 | Freeman et al. | |
| 11,041,399 | B2 | 6/2021 | Lutjen et al. | |
| 11,473,436 | B2 * | 10/2022 | Verma | F01D 11/00 |
| 2002/0046678 | A1 * | 4/2002 | Fecko | B65D 90/022 |
| | | | | 105/404 |
| 2012/0177495 | A1 * | 7/2012 | Virkler | F01D 5/066 |
| | | | | 416/182 |
| 2019/0136712 | A1 * | 5/2019 | Chandramohanan | F02C 7/24 |
| 2019/0353043 | A1 * | 11/2019 | Stevens | F01D 25/145 |
| 2021/0108527 | A1 * | 4/2021 | Verma | F01D 11/00 |
| 2022/0034236 | A1 * | 2/2022 | Scholtes | F01D 25/145 |
| 2022/0275812 | A1 * | 9/2022 | Maurer | F04D 29/644 |

FOREIGN PATENT DOCUMENTS

| | | | | |
|---|---|---|---|---|
| DE | 3830762 | A1 * | 3/1990 | F01D 25/145 |
| EP | 1106785 | | 1/2004 | |
| EP | 2927159 | A2 * | 10/2015 | B65D 90/0066 |
| FR | 2957115 | A1 * | 9/2011 | F01D 25/145 |
| FR | 2995340 | A1 * | 3/2014 | F01D 1/02 |
| WO | WO-9704196 | A1 * | 2/1997 | B32B 3/06 |

* cited by examiner

HEAT SHIELD AND METHOD OF INSTALLING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

The gas turbine engine may include relatively low-temperature components that are adjacent relatively high-temperature components. For instance, ceramic-based components have relatively high temperature capabilities but may be adjacent metallic components with lower temperature heat capabilities within a gas turbine engine. During engine operation and shutdown, the ceramic-based components may radiate heat to the metallic components, which can be detrimental to the metallic components integrity and/or lifespan.

SUMMARY

A heat shield according to an exemplary embodiment of this disclosure, among other possible things includes a first wall defined between a first end and a second end and a second wall defined between the first end and the second end. The second wall is connected to the first wall at the first and second ends. A space is defined between the first wall and the second wall and thermal insulation is disposed in the space.

In a further example of the foregoing, the heat shield includes a first flange at the first end and a second flange at the second end. The first and second walls are connected at the first and second flanges.

In a further example of any of the foregoing, the first and second flanges extend in opposite directions.

In a further example of any of the foregoing, at least one of the first and second walls includes at least one raised portion extending into the space.

In a further example of any of the foregoing, at least one of the first and second walls includes at least one hole.

In a further example of any of the foregoing, the heat shield includes a mesh covering over the at least one hole.

In a further example of any of the foregoing, the first end includes at least one locating feature.

In a further example of any of the foregoing, the second end includes at least one anti-rotation feature.

A gas turbine engine according to an exemplary embodiment of this disclosure, among other possible things includes a first component, and a second component adjacent the first component. The first component has a higher temperature capability than the second component. A heat shield is between the first and second components. The heat shield includes a first wall defined between a first end and a second end and a second wall defined between the first end and the second end. The second wall is connected to the first wall at the first and second ends. A space is defined between the first wall and the second wall, and thermal insulation is disposed in the space.

In a further example of the foregoing, the first component is a ceramic matrix composite component and the second component is a metallic component.

In a further example of any of the foregoing, the first component is a ceramic matrix composite ring and the second component is a metallic engine casing structure.

In a further example of any of the foregoing, the first component has first and second flanges extending away from a central axis of the engine.

In a further example of any of the foregoing, the heat shield includes first and second flanges at the first and second ends, respectively, corresponding to the first and second flanges of the first component, respectively.

In a further example of any of the foregoing, the first and second walls of the heat shield are connected at the first and second flanges of the heat shield.

In a further example of any of the foregoing, the heat shield includes a locating feature on the first flange configured to locate the first flange of the heat shield with respect to the first flange of the first component.

In a further example of any of the foregoing, the locating feature includes a tab configured to engage with a bayonet locking slot on the first flange of the first component.

In a further example of any of the foregoing, the heat shield includes an anti-rotation feature on the second flange configured to prevent rotation of the heat shield with respect to the first component.

In a further example of any of the foregoing, at least one of the first and second walls includes at least one raised portion extending into the space.

In a further example of any of the foregoing, at least one of the first and second walls includes at least one hole.

A method of installing a heat shield in a gas turbine engine according to an exemplary embodiment of this disclosure, among other possible things includes inserting a heat shield between a first component and a second component of a gas turbine engine in a first orientation, the first component having a higher temperature capability than the second component. The method also includes locating the heat shield with respect to the first component, rotating the heat shield circumferentially with respect to a central axis of the gas turbine engine, and locking the heat shield to prevent rotation of the heat shield with respect to the first component.

DETAILED DESCRIPTION

Figure 1:
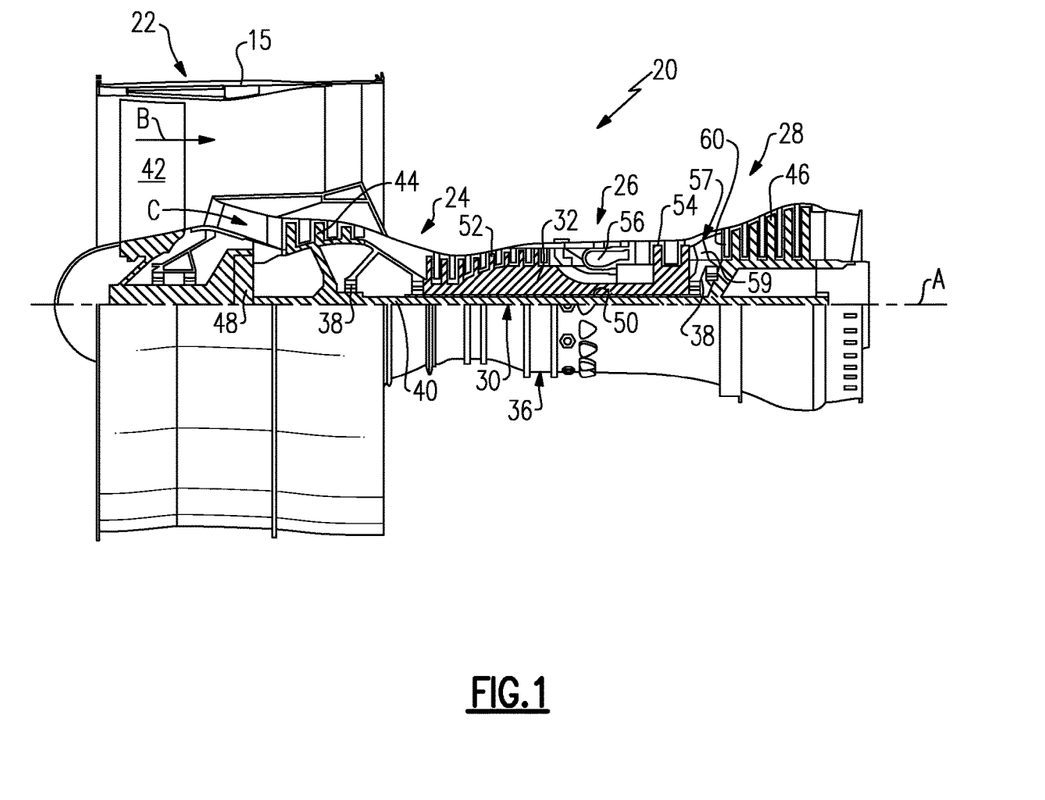
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

The gas turbine engine 20 may include a combination of high-temperature capability components and lower-temperature capability components, depending on their use and locating within the engine 20. For instance, components within or near the core flow path C must be able to withstand very high temperatures, while components spaced away from the core flow path C, such as casing hardware, may not be design with the same high-temperature capabilities. The components may be metallic components or combinations of metallic and ceramic-based components. The high-temperature components could be high-temperature superalloys, or ceramic-based components such as ceramic matrix composite (CMC) components, both of which are known in the art. During engine 20 operation, the high-temperature components become very hot and may radiate heat to the surrounding lower-temperature components. Moreover, the radiation may continue after the engine 20 is shutdown, when normal cooling strategies are discontinued. This is known as soak-back.

Figure 2:
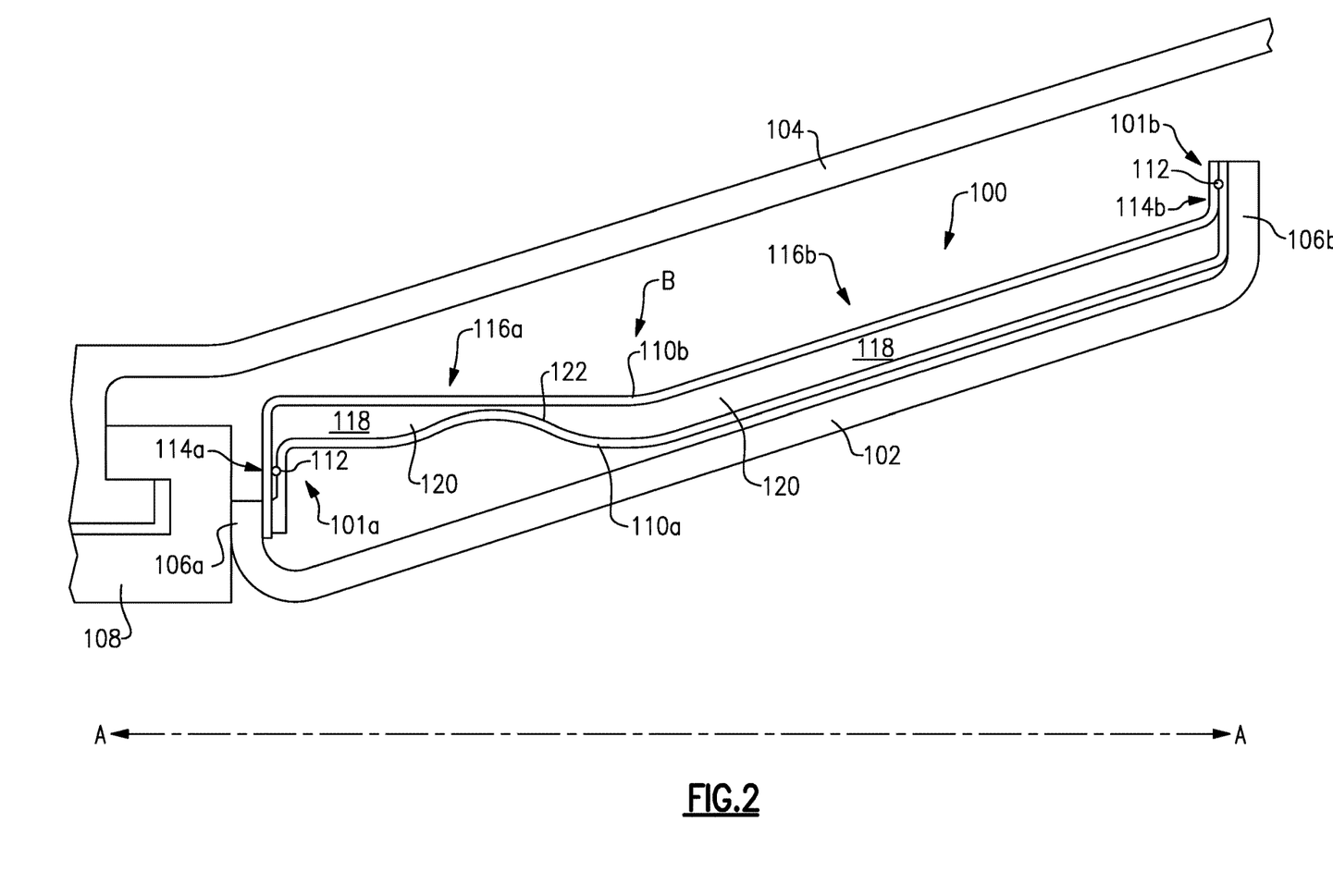
FIG. 2 schematically illustrates a cutaway view of the gas turbine engine of FIG. 1 with a heat shield.

Accordingly, a heat shield 100, shown in FIG. 2, is employed between high-temperature components and surrounding lower-temperature components. Employing a heat shield 100 in this manner can be challenging due to the geometry and assembly requirements of the high/low temperature components. This is especially the case for full-hoop components (i.e., those that extend around the entire circumference of the gas turbine engine) with flanges. However, the heat shield 100 is suited for use between full-hoop high-temperature components and surrounding lower-temperature structures, which in turn improves the integrity and longevity of the lower-temperatures structures by protecting them from heat radiation from the high-temperature components.

In the example of FIG. 2, the heat shield 100 is disposed between a CMC ring 102 (a high temperature component) and a metallic engine casing structure 104 (a relatively lower temperature component). However, it should be understood that the heat shield 100 could be employed between any high-temperature full-hoop flanged component and surrounding lower-temperature structures.

Referring again to FIG. 2, the CMC ring 102 has flanges 106a/106b on either end. The flanges 106a/106b extend outwardly with respect to the engine axis A. The flanges 106a/106b mate with surrounding components. In this particular example, the CMC ring 102 is disposed between adjacent blade outer air seals 108, and the flanges 106a/106b facilitate mating the CMC ring 102 with the blade outer air seals 108. In other examples, however, the CMC ring 102 could be arranged near other structures such as carrier or casing structures. For ease of reference, this description will refer to the structures near the CMC ring 102 as blade outer air seals 108, but it should be understood that other structures are contemplated, too.

Figure 3:
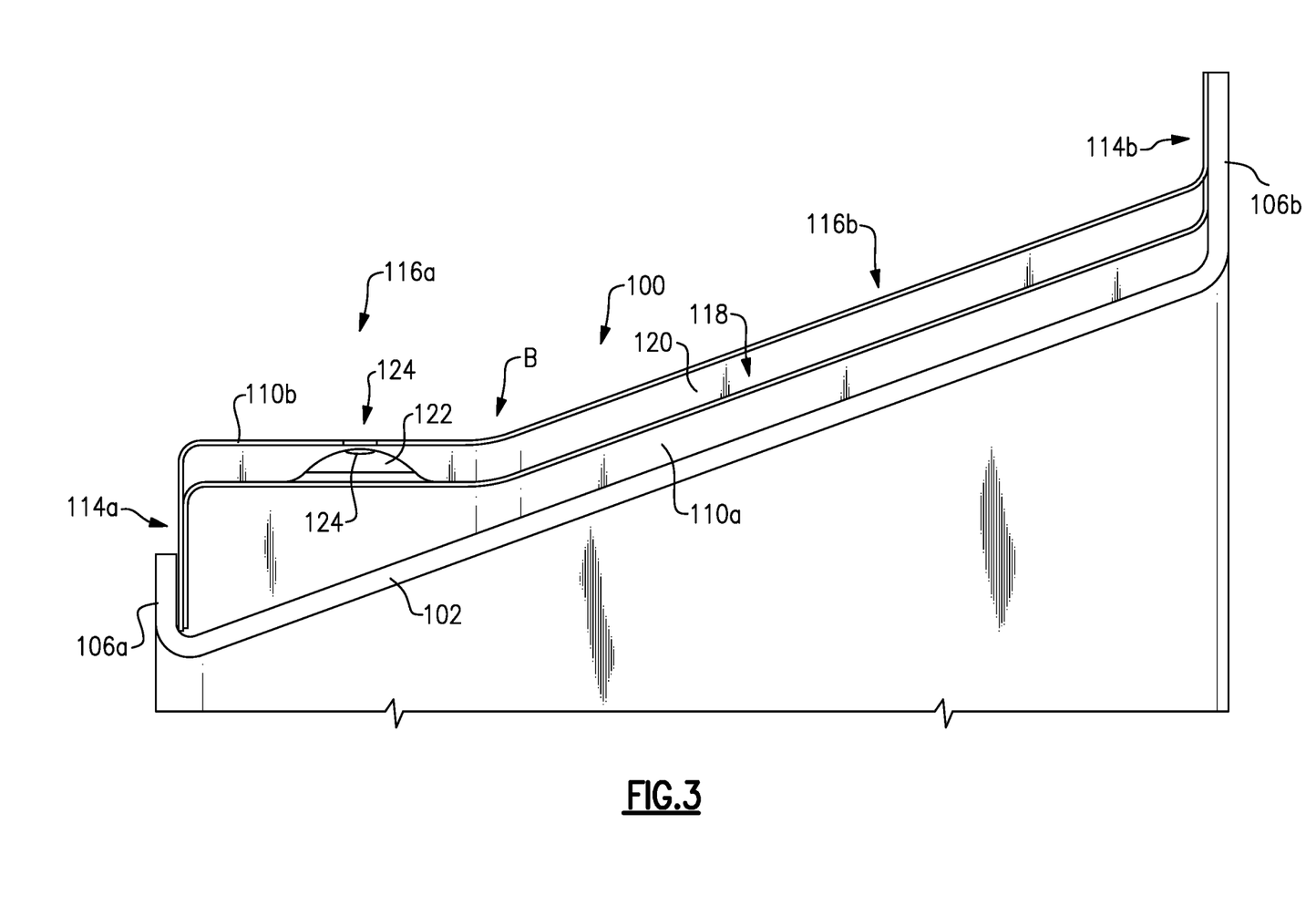
FIG. 3 schematically illustrates the heat shield of FIG. 2.
Figure 4A:
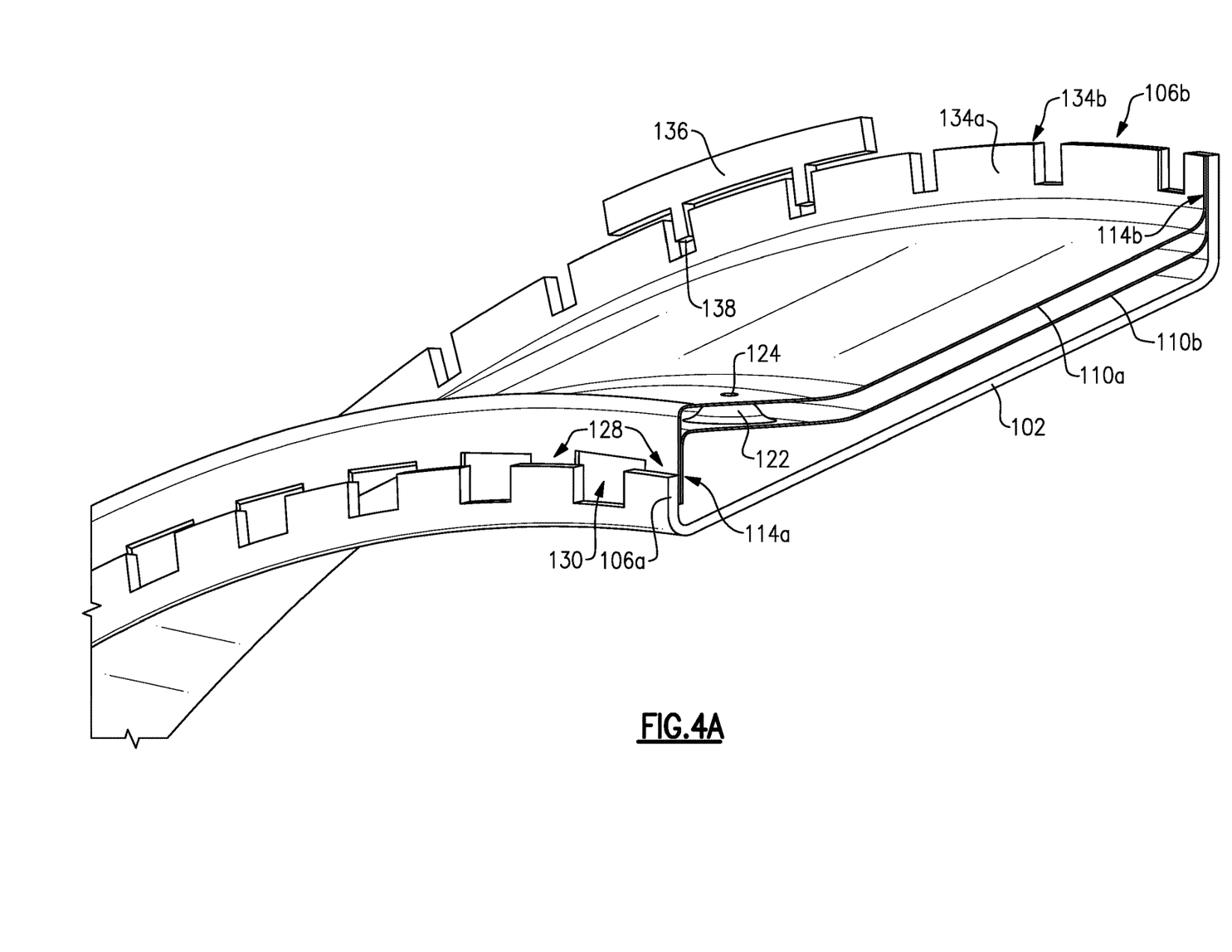
FIGS. 4a-b schematically illustrate perspective views of the heat shield of FIGS. 2-3b.
Figures 4B, 4C:
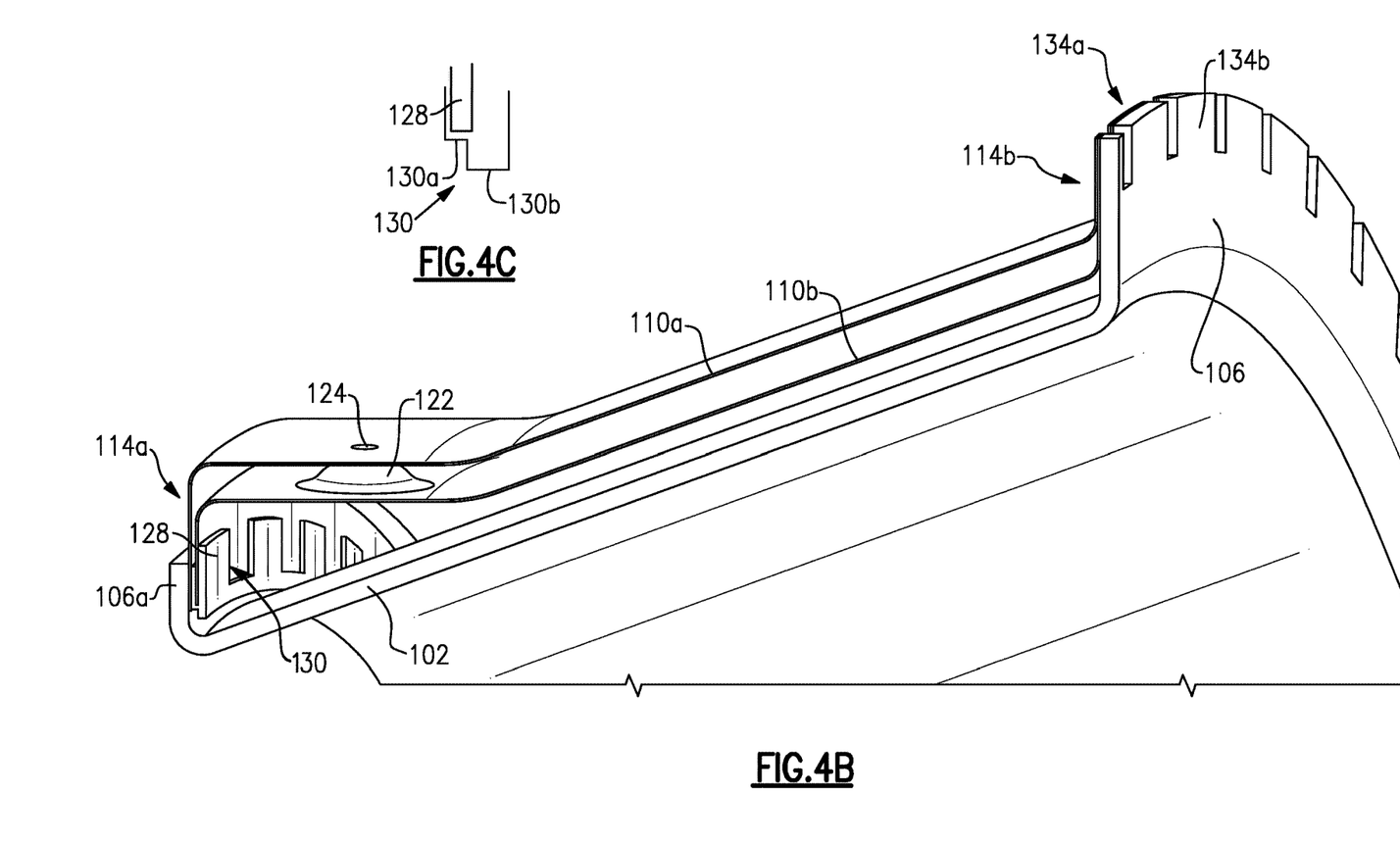
FIG. 4c schematically illustrates a detail view of a locating feature of the heat shield of FIGS. 2-4b.

FIG. 3 shows the heat shield 100 in isolation with the CMC ring 102. FIGS. 4a-b show perspective views of the heat shield 100 and CMC ring 102. With continued reference to FIG. 2 and with reference to FIGS. 3-4b, the heat shield 100 extends between opposed ends 101a/101b and includes first and second walls 110a/110b. The opposed ends 101a/101b correspond to forward and aft ends of the engine 20, respectively, when the heat shield 100 is installed in the engine 20. The first and second walls 110a/110b are connected to one another at the opposed ends 101a/101b of the heat shield 100. Each end 101a/101b can include one or more connection 112, which can be a resistance seam or spot weld, or a brazed portion, in some examples. In some particular examples, the heat shield 100 includes overlapping flanges 114a/114a at either end 101a/101b that are comprised of overlapping portions of each of the walls 110a/110b and the connection 112 is formed in the flanges 114a/114b. The flanges 114a/114b correspond to the flanges 106a/106b of the CMC ring 102.

When the heat shield 100 is installed in the engine 20, the flanges 114a/114b of the heat shield abut the flanges 106a/106b of the CMC ring 102. In one example, the flanges 114a/114b extend in opposite directions. The is, the flange 114a extends towards the CMC ring 102 and towards the engine axis A while the flange 114b extends away from the CMC ring 102 and away from the engine axis A. However, other configurations are also contemplated.

In one example, the first and second walls 110a/110b are comprised of sheet metal of a high-temperature superalloy such a nickel-based, cobalt-based, or nickel-cobalt alloy. Examples includes Waspaloy® (Rolled Alloys, Inc.), Inconel alloys, Mar-M-509, Haynes® alloys (Haynes International) and single crystal nickel superalloys. In a particular example, the superalloy is generally inert with respect to CMC components.

The heat shield 100 includes a bend B that separates a first portion 116a from a second portion 116b of the heat shield. In a particular example, the bend is about 30 degrees. As best seen in FIG. 2, the first portion 116a is approximately parallel to the engine axis A when the heat shield 100 is installed in the engine 20. The second portion 116b is angled away from the engine axis A with respect to the first portion 116a and tracks the geometry of the CMC ring 102 when the heat shield 100 is installed in the engine 20.

Between the opposed ends 101a/101b of the heat shield 100, the first and second walls 110a/110b define a space 118 therebetween. Thermal insulation 120 is situated in the space 118. The thermal insulation 120 can be any high-temperature capable thermal insulation. In this way, the thermal insulation 120 is contained within the heat shield 100 and reduces the radiation of heat from the CMC ring 102 to the engine casing structure 104 as discussed above. Moreover, the thermal insulation is prevented from entering the gaspath of the engine 20.

Figure 5:
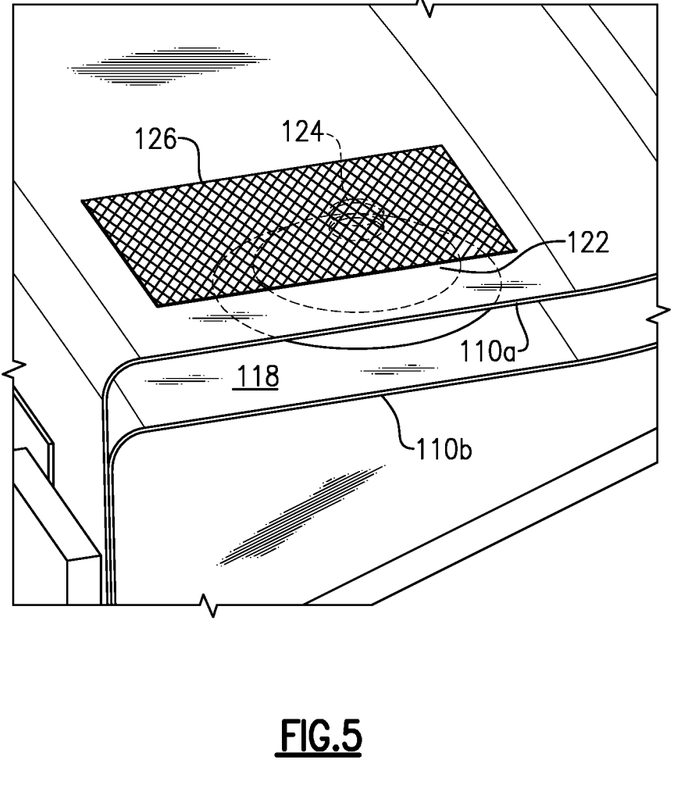
FIG. 5 schematically illustrates a detail view of the heat shield if FIGS. 2-4b.

In some examples, one or both of the walls 110a/110b include one or more raised portions 122 extending into the space 118, such as dimples or domes (though other geometries are contemplated). FIG. 5 shows a detail view of a raised portion 122. The raised portion(s) 122 further trap the thermal insulation 120 between the walls 110a/110b and further reduce movement of the thermal insulation 120 within the space 118.

One or both of the walls 110a/110b include holes 124. The holes 124 allow fluid to move through and around the heat shield 100 to prevent the formation of a pressure differential across or within the heat shield 100. Accordingly, the heat shield need not withstand high pressure loads. In some particular examples, the holes 124 can be in the raised portions 122.

In some examples, the holes 124 are covered with mesh covers 126. The mesh cover 126 can be within the space 118 or at the exterior of the heat shield 100. Should pieces of thermal insulation 120 become loose, the mesh covers 126 prevent the pieces from entering the gaspath and/or non-gaspath cavities of the engine 20. The mesh covers 126 can be tack welded or otherwise attached to the walls 110a/110b.

The flanges 106a/10b6 of the CMC ring 102 can present challenges for locating and securing components near the CMC ring 102. In general, as will be explained below in more detail, the heat shield 100 is inserted into position in a first orientation, and then rotated to a second orientation in which it is locked into place. Accordingly, the heat shield 100 includes at least one locating feature that accommodates this rotation and at least one anti-rotation feature to lock the heat shield 100 into place.

Figure 6A:
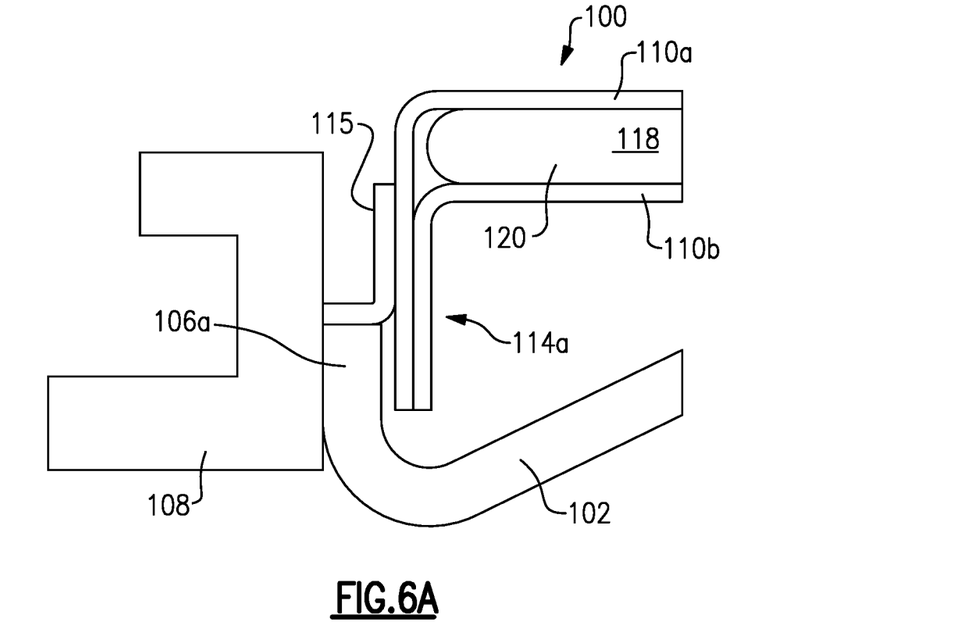
FIG. 6a schematically illustrates a detail view of a flange of the heat shield of FIGS. 2-5.

In one example locating feature at the forward end 101a, the heat shield 100 includes one or more tabs 128 which correspond with bayonet locking slots 130 on the flange 106a of the CMC ring 102, best shown in FIGS. 4a-b and 6a. In this example, the flange 114a of the of the heat shield 100 is located relative to the flange 106a of the CMC ring 102. An optional bracket 115 may be included between the flange 114a of the heat shield 100 and the blade outer air seal 108 to provide support and/or assist in locating the flange 114a. The bayonet locking slots 130 include a first portion 130a and a second portion 130b, shown in FIG. 4c. The tabs 128 are configured to be inserted into the first portion 130a of the bayonet locking slots 130 in a first orientation, and when the heat shield 100 is rotated, the tabs 128 are received in the second portion 130b of the bayonet locking slots 130, locating the heat shield 100 into place.

Figure 6B:
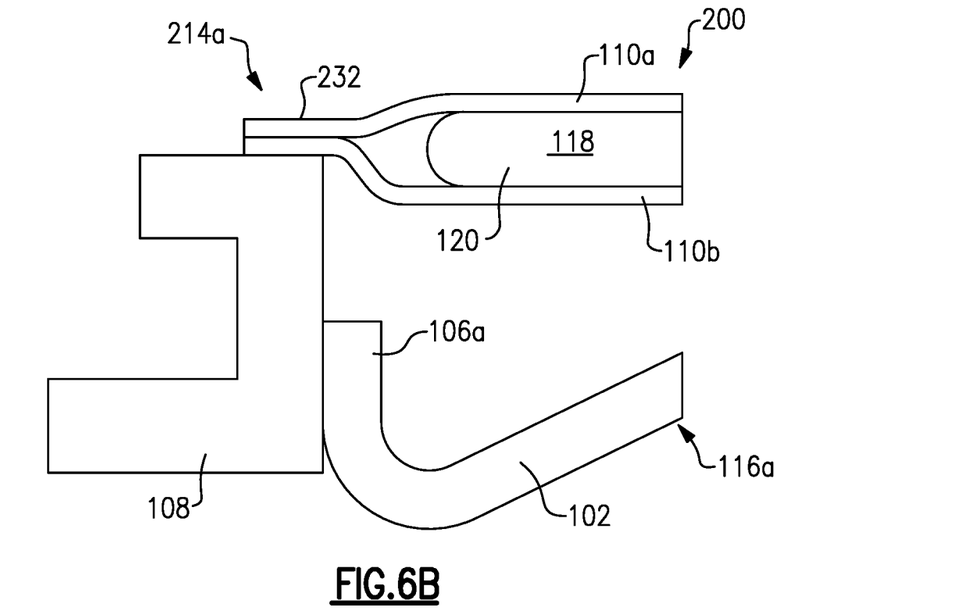
FIG. 6b schematically illustrates a detail view of an alternate heat shield.

In another example locating feature at the forward end 101a, shown in FIG. 6b, an alternate heat shield 200 includes a flange 214a extending generally parallel to the first portion 116a of the heat shield 100 and includes a tab 132 that is configured to interact with and be located with respect to a radially outward surface of the blade outer air seal 108. The tabs 128 and bayonet locking slots 130 may be omitted, in this example. The tab 132 assists in maintaining concentricity and/or position of the heat shield 100 relative to the engine 20 axis A. One or both of the foregoing locating features can be used at the forward end 101a.

Likewise the aft end 101b includes an anti-rotation feature to prevent the heat shield 100 from rotating with respect to the CMC ring 102, including preventing disengagement at the forward end 101a locating features. In one example, the anti-rotation feature includes a series of tabs 134a on the flange 114b of the heat shield 100 which are aligned with corresponding tabs 134b on the flange 106b of the CMC ring 102. The tabs 134a/134b are configured to interact with a surrounding structure such as blade outer air seal 108, carrier, case structure, or other member to prevent rotation of the heat shield 100 and CMC ring 102 with respect to one another and the blade outer air seal 108. For instance, a lock 136 with slots 138 that correspond to the tabs 134a/134b interacts with the tabs 134a/134b.

Any number of tabs 134a/134b can be used, and any number of tabs 128 can be used, so long as the tabs are sufficient to provide the locating/anti-rotation as discussed above. The number of tabs 134a/134b and tabs 128 can be the same or different.

The heat shield 100 is installed in the engine 20 as follows. The heat shield 100 is inserted between the CMC ring 102 and the engine casing structure 104 in an aftward direction and in a first orientation. The heat shield 100 is then located with respect to the CMC ring 102 by engagement at the forward end 101a with the locating feature(s) discussed above. The heat shield 100 is then rotated circumferentially to a second orientation, shown in FIG. 2. The rotation can be up to about 120 degrees. The heat shield 100 is locked in place at the aft end 101b by engaging the anti-rotation feature discussed above.

In one example, the heat shield 100 is located in between adjacent blade outer air seals 108 near the high pressure turbine 54 of the engine 20 and is rotated circumferentially an amount that corresponds to the vane or anti-rotation feature count for the corresponding stage of the high pressure turbine 54 according to the following relationship: degrees rotated=360/feature count. For instance, if the vane count in a stage of the high pressure turbine 54 is 36, a heat shield 100 installed adjacent that stage would be rotated 10 degrees.

As a result of the heat shield 100, the engine 20 can be operated at higher temperatures because the heat shield 100 protects the relatively lower temperature components of the engine such as engine casing structure 104 from excessive heat. This in turn can improve the overall efficiency of the engine 20. Moreover, the heat shield can be installed adjacent flanged full-hoop components despite the challenges associated with such installation according to the methods discussed above.

As used herein, the term "approximately" has the typical meaning in the art, however in a particular example "approximately" can mean deviations of up to 10% of the values described herein.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A heat shield, comprising:
   a first wall defined between a first end and a second end and extending generally in a first direction;
   a second wall defined between the first end and the second end, the second wall connected to the first wall at the first and second ends and extending generally in the first direction;
   a space defined between the first wall and the second wall;
   thermal insulation disposed in the space; and
   a first flange at the first end and a second flange at the second end, wherein the first and second walls are connected at the first and second flanges and wherein the first and second flanges each extend in a direction different from the first direction,
   wherein at least one of the first and second walls includes at least one hole, and further comprising a mesh covering over the at least one hole.

2. The heat shield of claim 1, wherein the first and second flanges extend in opposite directions.

3. The heat shield of claim 1, wherein at least one of the first and second walls includes at least one raised portion extending into the space.

4. The heat shield of claim 1, wherein the first end includes at least one locating feature.

5. The heat shield of claim 1, wherein the second end includes at least one anti-rotation feature.

6. A gas turbine engine, comprising:
   a first component having first and second flanges extending away from a central axis of the engine;
   a second component adjacent the first component, the first component having a higher temperature capability than the second component; and
   a heat shield between the first and second components, the heat shield including
     a first wall defined between a first end and a second end;
     a second wall defined between the first end and the second end, the second wall connected to the first wall at the first and second ends;
     a space defined between the first wall and the second wall, and
     thermal insulation disposed in the space, wherein the heat shield includes first and second flanges at the first and second ends, respectively, corresponding to the first and second flanges of the first component, respectively.

7. The gas turbine engine of claim 6, wherein the first component is a ceramic matrix composite component and the second component is a metallic component.

8. The gas turbine engine of claim 7, wherein the first component is a ceramic matrix composite ring and the second component is a metallic engine casing structure.

9. The gas turbine engine of claim 6, wherein the first and second walls of the heat shield are connected at the first and second flanges of the heat shield.

10. The gas turbine engine of claim 6, wherein the heat shield includes a locating feature on the first flange configured to locate the first flange of the heat shield with respect to the first flange of the first component.

11. The gas turbine engine of claim 10, wherein the locating feature includes a tab configured to engage with a bayonet locking slot on the first flange of the first component.

12. The gas turbine engine of claim 6, where in the heat shield includes an anti-rotation feature on the second flange configured to prevent rotation of the heat shield with respect to the first component.

13. The gas turbine engine of claim 6, wherein at least one of the first and second walls includes at least one raised portion extending into the space.

14. The gas turbine engine of claim 6, wherein at least one of the first and second walls includes at least one hole.

15. A method of installing a heat shield in a gas turbine engine, comprising:
- inserting a heat shield between a first component and a second component of a gas turbine engine in a first orientation, the first component having a higher temperature capability than the second component, and the first component having first and second flanges extending away from a central axis of the engine;
- locating the heat shield with respect to the first component, wherein the heat shield includes first and second flanges at the first and second ends, respectively, corresponding to the first and second flanges of the first component, respectively;
- rotating the heat shield circumferentially with respect to a central axis of the gas turbine engine; and
- locking the heat shield to prevent rotation of the heat shield with respect to the first component.

* * * * *